US007677605B2

(12) United States Patent
Cook et al.

(10) Patent No.: US 7,677,605 B2
(45) Date of Patent: Mar. 16, 2010

(54) HOSE-CLAMP SYSTEM FOR AN INFLATABLE MEDICAL DEVICE

(75) Inventors: Gordon J. Cook, Andover (GB); Graeme Follett, Basingstoke (GB); David G. Portsmouth, Andover (GB); Ben Davies, Alverstoke (GB)

(73) Assignee: Novamedix Distribution Limited (CY)

( * ) Notice: Subject to any disclaimer, the term of this patent is extended or adjusted under 35 U.S.C. 154(b) by 0 days.

(21) Appl. No.: 12/272,549

(22) Filed: Nov. 17, 2008

(65) Prior Publication Data

US 2009/0121480 A1 May 14, 2009

Related U.S. Application Data

(62) Division of application No. 10/821,012, filed on Apr. 8, 2004, now Pat. No. 7,452,340.

(30) Foreign Application Priority Data

Dec. 31, 2003 (GB) ................................ 0330203.1

(51) Int. Cl.
*F16L 33/00* (2006.01)
*A61H 7/00* (2006.01)

(52) U.S. Cl. ....................... 285/256; 285/259; 601/151; 602/13

(58) Field of Classification Search ................. 285/242, 285/255, 256, 259; 601/151, 152; 602/13; 606/202
See application file for complete search history.

(56) References Cited

U.S. PATENT DOCUMENTS

| | | | | |
|---|---|---|---|---|
| 48,709 | A * | 7/1865 | Emory | 285/251 |
| 2,002,839 | A * | 5/1935 | Stecher | 285/256 |
| 3,139,293 | A * | 6/1964 | Franck | 285/4 |
| 4,064,614 | A * | 12/1977 | Horvath | 29/890.144 |
| 4,212,487 | A * | 7/1980 | Jones et al. | 285/95 |
| 4,462,622 | A * | 7/1984 | Barzuza | 285/323 |
| 4,809,684 | A | 3/1989 | Gardner et al. | |
| 4,846,160 | A | 7/1989 | Gardner et al. | |
| 4,941,458 | A | 7/1990 | Taheri | |
| 5,267,952 | A | 12/1993 | Gardner | |
| 5,354,260 | A | 10/1994 | Cook | |
| 5,584,798 | A | 12/1996 | Fox | |
| 5,622,393 | A * | 4/1997 | Elbich et al. | 285/245 |
| 5,634,889 | A | 6/1997 | Gardner et al. | |

(Continued)

FOREIGN PATENT DOCUMENTS

DE 3436951 A1 * 4/1986

OTHER PUBLICATIONS

Results of Partial International Search in PCT/GB04-000943.

*Primary Examiner*—James M Hewitt
(74) *Attorney, Agent, or Firm*—Baker & McKenzie LLP

(57) ABSTRACT

A hose-clamp system for securing a hose to an air connector that engages an inflation port of a garment for use in pump therapy for enhancing venous and arterial blood flow of a human foot. The system includes a fitting having an internal stem and an external stem, the internal stem configured to engage an inside diameter of an end of the hose, a cradle configured to received the internal stem and the end of the hose and having opposing locking protrusions, and a seal positioned from the locking protrusions at substantially the length of the internal stem and configured to engage the external stem.

5 Claims, 15 Drawing Sheets

U.S. PATENT DOCUMENTS

| | | | | | |
|---|---|---|---|---|---|
| 5,669,872 | A | | 9/1997 | Fox | |
| 5,676,642 | A | | 10/1997 | Peters | |
| 5,772,262 | A | * | 6/1998 | Dupont et al. | 285/257 |
| 5,820,166 | A | * | 10/1998 | Webb | 285/23 |
| 5,843,007 | A | | 12/1998 | McEwen et al. | |
| 5,915,739 | A | * | 6/1999 | Cradduck et al. | 285/114 |
| 5,931,797 | A | | 8/1999 | Tumey et al. | |
| 5,989,204 | A | | 11/1999 | Lina | |
| 5,997,495 | A | | 12/1999 | Cook et al. | |
| 6,000,730 | A | * | 12/1999 | Owens | 285/256 |
| 6,129,688 | A | | 10/2000 | Arkans | |
| 6,290,662 | B1 | | 9/2001 | Morris et al. | |
| 6,319,215 | B1 | | 11/2001 | Manor et al. | |
| 6,361,512 | B1 | | 3/2002 | Mackay et al. | |
| 6,592,534 | B1 | | 7/2003 | Rutt et al. | |
| 7,014,217 | B2 | * | 3/2006 | Liu | 285/255 |
| 7,370,889 | B2 | * | 5/2008 | Maunder et al. | 285/242 |
| 7,438,240 | B2 | * | 10/2008 | Rabe | 239/525 |
| 2004/0239110 | A1 | * | 12/2004 | Pedersen et al. | 285/255 |
| 2006/0028019 | A1 | * | 2/2006 | Nilsen et al. | 285/256 |
| 2006/0232063 | A1 | * | 10/2006 | Steingass et al. | 285/242 |

* cited by examiner

HOSE-CLAMP SYSTEM FOR AN INFLATABLE MEDICAL DEVICE

PRIORITY CLAIM

This application claims priority from U.S. patent application Ser. No. 10/821,012 filed Apr. 8, 2004 which is hereby incorporated by reference herein.

TECHNICAL FIELD

Disclosed embodiments herein relate generally to inflatable medical devices, and more particularly to an inflatable impulse therapy garment applied to a limb or other body part for use in pump therapy for enhancing venous and arterial blood flow within the body part.

BACKGROUND

The use of inflatable garments on the limbs or other body parts for enhancing blood circulation in and around that limb or body part is a well established technique with proven benefits. Such a garment usually includes an inflatable bladder located as part of a means for attaching or securing the garment about the area to be treated. During use, the bladder is filled with a fluid, such as air, to expand and apply force to the body part. The force is directed in such a way as to empty the veins of blood when the bladder is fully inflated. Once inflated, the pressure in the bladder is typically held for a predetermined period of time, before releasing the fluid so that the cycle may be repeated. The rate of filling or venting the bladder may vary from fractions of a second to several seconds according to the application.

To use the garment, the garment is attached, for example, to the foot typically by straps. Specifically, the straps may be attached with hook-and-loop fasteners for easy attachment and removal of the garment to the body part. For many such garments, the straps are wrapped around the dorsum of the foot and around the heel. Unfortunately, the straps on such conventional garments, as well as the garments themselves, are sized and shaped for universal application. As a result, the straps on conventional garments typically provide limited adjustment of the various components on the garment for customizing the fit of the garment during use.

BRIEF SUMMARY

Disclosed herein are exemplary embodiments of an impulse therapy garment for use in pump therapy for enhancing venous and arterial blood flow. The garment may be advantageously fitted to a human foot, and may include a rotationally positionable heel-strap, a rotationally positionable air inlet connector, separate dorsum straps, as well as other features.

In one embodiment, the garment comprises an elongated upper fabric comprising a length sufficient to wrap around the arch and dorsum of the foot along a path perpendicular to a length of the foot, and comprising a width substantially coextensive with a span comprising the ball and heel of the foot. In addition, the garment includes an inflatable bladder coupled to the fabric and configured to press against the arch of the foot when inflated, the inflation further configured to direct a force against the dorsum of the foot. Furthermore, the garment includes a heel strap in pivotal relationship with the upper fabric and configured to be positioned around the back of the heel of the foot. As such, a first end of the heel strap is pivotally coupled proximate the outer surface of the upper fabric at a side of the foot when the upper fabric is wrapped around the foot, and a second end is removeably coupled to the outer surface of the upper fabric at another side of the foot (e.g., the dorsum) when the upper fabric is wrapped around the foot. The rotationally positionable heel strap improves patient comfort and treatment compliance during deep-venous thrombosis treatment sessions. In addition, this technology allows a single garment to either universally fit both left and right feet, or the orientation to be determined at the point of manufacture or use.

Other embodiments of the garment may include a similar upper fabric and an inflatable bladder coupled to the fabric and configured to press against the arch of the foot when inflated, the inflation further configured to direct a force against the dorsum of the foot. In addition, in such embodiments, the garment may further include a bladder retention means configured to retain an end of the bladder to the upper fabric to allow substantially differential movement between the upper fabric and non-retained portions of the bladder during inflation and deflation of the bladder.

Other embodiments of the garment may also include a similar upper fabric and inflatable bladder, and further include a plurality of dorsum straps extending from one end of the upper fabric, where each of the plurality of straps are configured to removeably attach to an outer surface of the upper fabric in independent locations to provide differential adjustment when securing the garment around the foot. In a specific embodiment, two dorsum straps are disclosed. In still other embodiments, distal ends of the plurality of dorsum straps may be removeably coupled to the outer surface of the upper fabric using hook-and-loop fasteners, where hook portions are on the distal ends and loop portions are on the outer surface of the upper fabric.

Still further embodiments may include a similar upper fabric as described above, as well as an inflatable bladder coupled to the fabric and configured to press against the arch of the foot when inflated, the inflation further configured to direct a force against the dorsum of the foot. Such embodiments may then also include a washer having a center hole locatable around the stem and configured to be forcibly retained against the outer surface of the upper fabric by snap-fit using annular stem protrusions extending from an external surface of the stem.

In yet other embodiments, an air connection for use with an impulse therapy garment is disclosed. In such embodiments, the air connector is hermetically coupled over the stem of the inflation port. The air connector may be configured to rotate about the stem to orient a hose opening located on a side of the air connector substantially perpendicular to a length of the stem.

In still further embodiments, a hose-clamp system for securing a hose to an air connector may also be included on the garment. For example, the system may comprise a fitting having an internal stem and an external stem, where the internal stem has a predetermined length and an outer diameter configured to hermetically engage an inside diameter of an end of the hose to the predetermined length. The system may also include a cradle configured to receive the internal stem and the end of the hose, where the cradle comprises opposing locking protrusions within the cradle and radially extending towards a center of the cradle, wherein a top of each locking protrusion is spaced from a top of another less than the outer diameter of the hose. The cradle may also include a seal positioned from the locking protrusions at substantially the length of the internal stem and configured to hermitically engage the external stem. As such, the locking protrusions are configured to crimp the outside diameter of the hose at an end of the internal stem distal the external stem when the external stem is received by the seal, and the hose and internal stem are received within the cradle.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which.

DETAILED DESCRIPTION OF PREFERRED EMBODIMENTS

Figure 1:
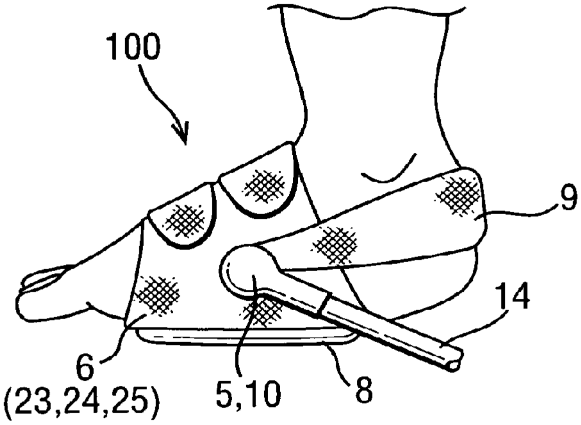
FIG. 1 illustrates a side view of one exemplary embodiment of a venous and arterial thrombosis garment constructed according to the principles disclosed herein and applied to a human foot.
Figure 2:
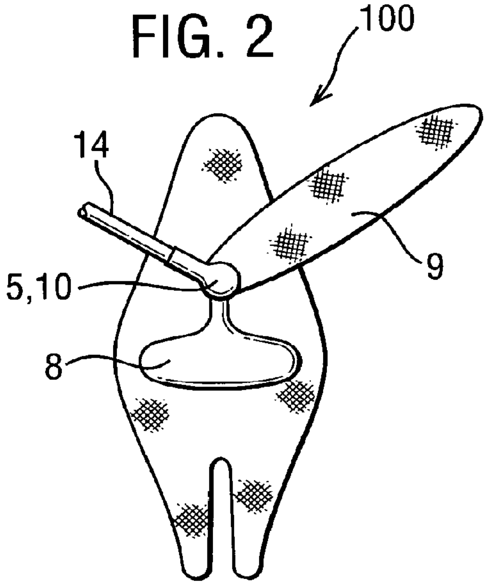
FIG. 2 illustrates an external view of the garment of FIG. 1 when removed from the foot.
Figure 3:
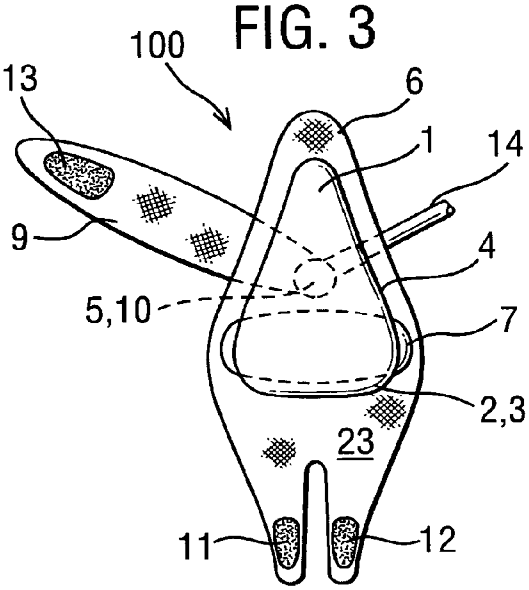
FIG. 3 illustrates an internal view of the garment of FIG. 2, as viewed from the side of the garment that contacts the foot when worn.

Referring collectively to FIGS. 1, 2 and 3, illustrated are various views of an exemplary embodiment of a venous and arterial thrombosis garment 100 constructed according to the principles disclosed herein. Specifically, FIG. 1 illustrates a side view of the garment 100 as applied to a human foot. FIG. 2 illustrates an external view of the garment 100 of FIG. 1 when removed from the foot. FIG. 3 illustrates an internal view of the garment 100, as viewed from the side of the garment 100 that contacts the foot when worn.

An exemplary embodiment of the garment 100 comprises a bladder 1, made from two films of flexible polymeric material (skin side film 2 and outer film 3, which are shown in greater detail in the remaining figures) joined at the periphery. In one embodiment, the films are joined using RF welding 4 to form a sealed pressure vessel. In addition, a flanged end of a port 5 is sealed to the outer film 3 for allowing air inside the bladder 1 during use. The entire bladder assembly (1, 2, 3, 4) is attached to an upper fabric 6 of the garment 100 and secured, for example, by passing a stem of the port 5 through the fabric of the garment 100 from its inner side, and snap engagement of a shank outer 8 over the stem of the port 5. In some embodiments, a washer may be used when no shank outer 8 is included on the garment, however either embodiment is contemplated.

During use, the bladder 1 configured to press against the arch, and perhaps the span, of the foot when inflated. In addition, the inflation is further configured to direct a force against the dorsum of the foot to assist in providing the desired proper blood-flow. In one embodiment, the bladder 1 may be designed so as to extend around the foot and to the dorsum in order to apply an inflation pressure against both the top and bottom of the foot. However, in other embodiments, the upper fabric 6 is configured to press against the dorsum of the foot when the bladder is inflated, as the garment is stretched by the inflation. The upper fabric 6 may be constructed from any number of materials, including, for example, a laminate or a cotton material. The upper fabric 6 includes a skin-side 23 that is closest to the skin of the patient wearing the garment 100. In addition, the upper fabric 6 may also include a foam interlayer 24 and an outer side 25, both of which may be seen in greater detail in figures discussed below.

Figure 20:
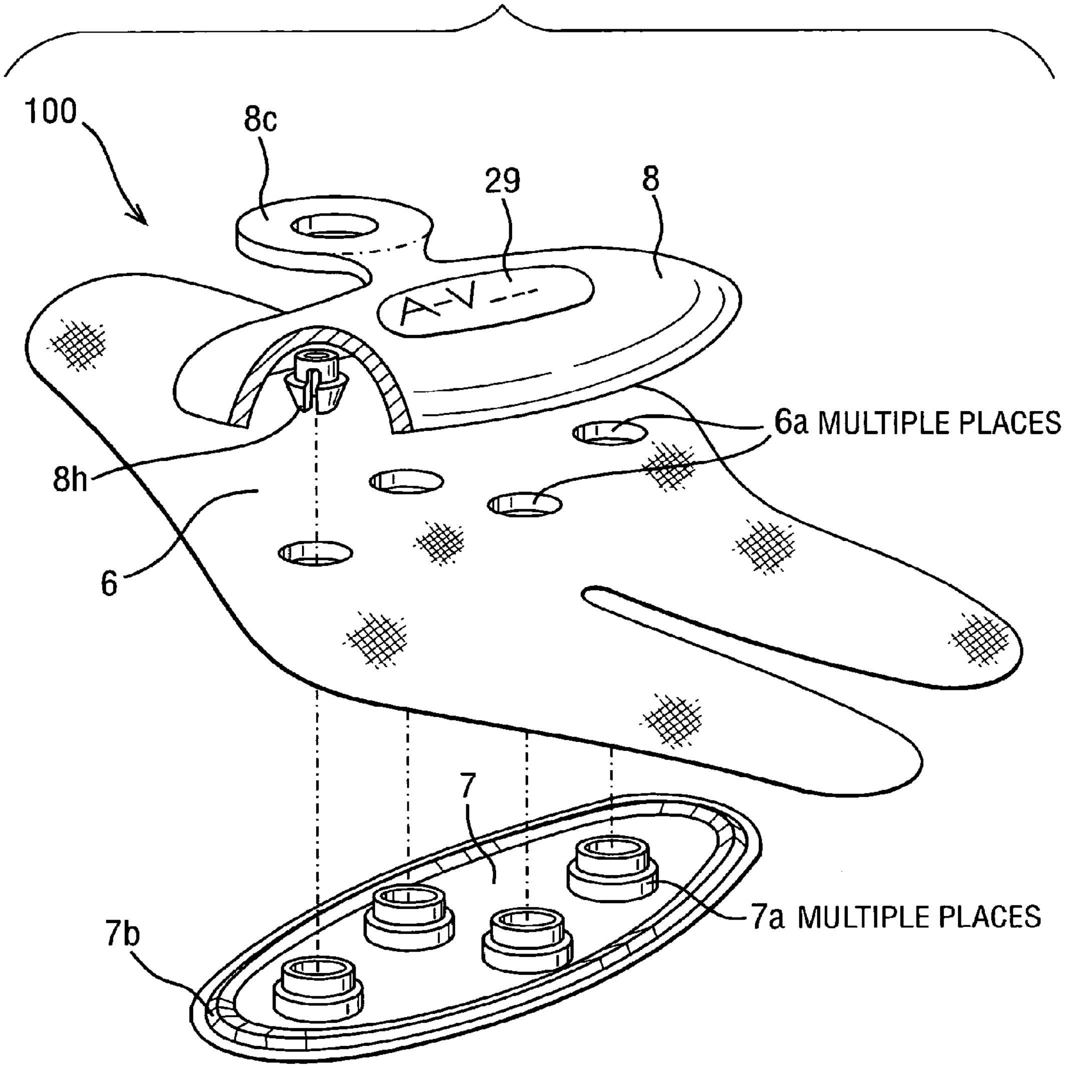
FIG. 20 illustrates an exploded isometric view of one embodiment of a shank outer for use with a garment constructed as disclosed herein.

A shank inner 7 is also illustrated and is located beneath the bladder 1. The shank inner 7 may be coupled to the shank outer 8, where each is positioned on either side of the upper fabric 6 and coupled together (e.g., by snapping, as shown in FIG. 20). In embodiments not including a shank outer 8, the shank inner 7 may be located within the layers of the upper fabric 6, or, alternatively, may be affixed to the skin-side of the upper fabric 6 using welding, fasteners, an adhesive or other type of affixing means. In addition, the garment 100 still further includes a heel strap 9, which is configured to embrace the backside of a foot proximate where the Achilles tendon attached to the heel bone. As illustrated, a pivot end of the heel strap 9 is fitted over the stem of port 5 and may be retained by an air connector 10, which is configured to fixedly engage the stem of the port 5. During use of the garment 100, air is forced into or vented from the bladder 1 through the air connector 10, and then through the port 5 and into the bladder 1. Also, an air hose 14 is fitted to air connector 10 to interconnect the bladder 1 with an external air generator or compressor (not illustrated).

The garment 100 may be secured to the foot at the dorsum by any appropriate fastener, for example, hook material 11, 12 attached to and engaging with loop material located on the outer side 25 of the dorsum straps of the upper fabric 6. Similarly, the garment 100 is prevented from sliding forward off of the foot by closure of the heel strap. In an exemplary embodiment, the heel strap 9 also includes hook material 13 on an end thereof, while the opposing pivot end of the heel strap 9 is attached to the garment 100. In such an embodiment, the hook material 13 engages with the loop material mentioned above that is on the outer side 25 of the upper fabric 6 when the dorsum straps are wrapped around the foot. Furthermore, for comfort during long periods of use, the skin side 23 of the upper fabric 6 may be laminated or otherwise treated with skin-friendly and biocompatible materials.

Figure 4:
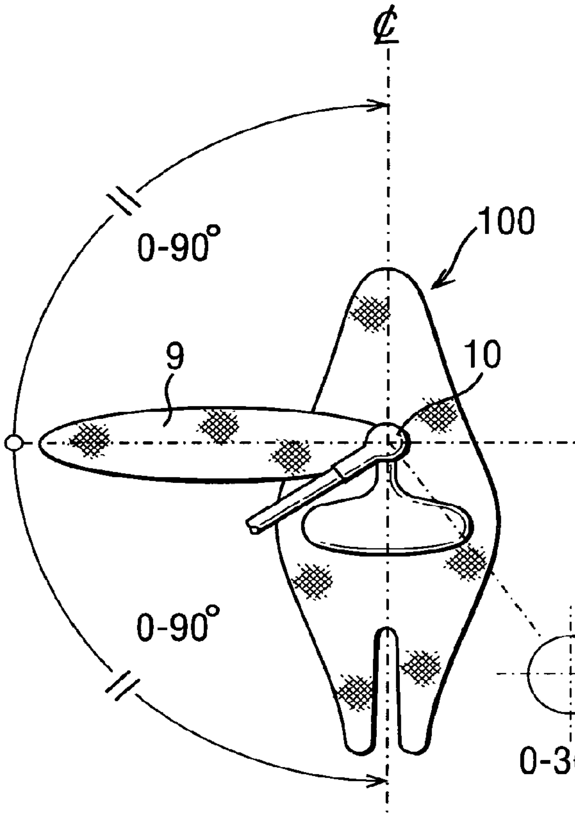
FIGS. 4 & 5 illustrate the garment of FIG. 2 with alternative locations of the heel-strap.
Figure 5:
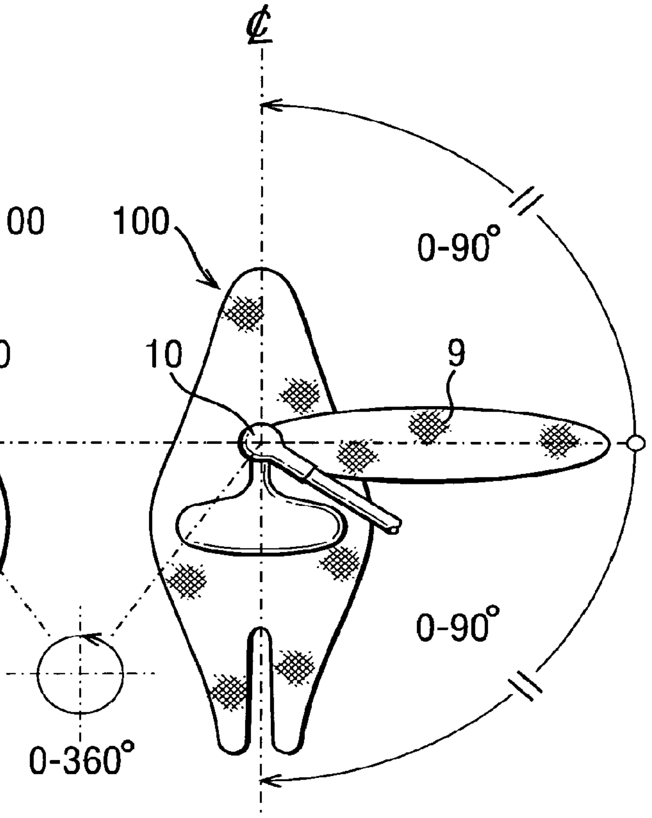

Turning next to FIGS. 4 & 5, illustrated is the garment 100 of FIG. 2 with alternative locations of the heel strap 9. In this embodiment, the garment 100 may be universal in that the heel strap 9 may be configured for use on either the left foot or right foot, as desired by the user. The garment 100 may be so configured through pivoting of the heel strap 9 and air connector 10 in a desired direction. In other respects, the garment 100 is typically symmetrical about a vertical centerline, and is thus made right-handed or left-handed simply by orientation of these components as shown in FIG. 4 (for Patient's left foot) or FIG. 5 (for Patient's right foot). In this general case, both the heel strap 9 and air connector 10 may be rotated independently of each other, at least through 360 degrees. Of course, the garment 100 may alternatively be permanently configured as right-handed or left-handed at the time of manufacture. Moreover, the garment 100 may be changeable between right-handed and left-handed by means other than through the pivoting of the heel strap 9 and the air connector 10 mentioned above.

Figure 6:
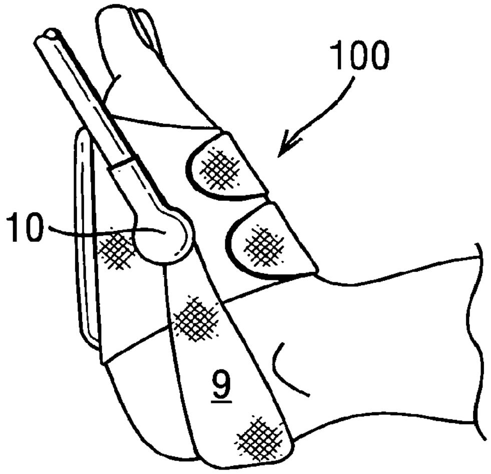
FIGS. 6 & 7 illustrate alternative exemplary embodiments of the disclosed garment as used when the person wearing the garment is confined to a bed.
Figure 7:
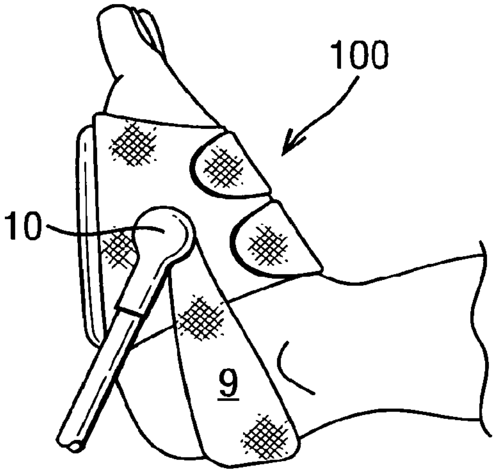

Turning next to FIGS. 6 & 7, illustrated are alternative exemplary embodiments of the disclosed garment 100 as used when the person wearing the garment 100 is confined to a bed. The universal garment 100 in this embodiment may be pre-configured for use on either the left foot or right foot, as desired by the manufacturer or user through adjustment of the heel strap 9 and air connector 10, as described in detail with reference to FIGS. 4 & 5.

In the illustrated embodiment of FIG. 6, the heel strap 9 of the garment 100 has been pre-positioned to suit the indicated foot (e.g., right or left) and the air connector 10 (and thus an attached air hose) aligned such that the air hose exits towards the patient's toes and towards the surface of a bed. This embodiment may beneficially be employed if the patient is lying on his stomach in the bed when using the garment 100. In the illustrated embodiment of FIG. 7, the heel strap 9 of the garment 100 has also been pre-positioned to suit the indicated foot (e.g., right or left), but the air connector 10 (and thus an attached air hose) has been aligned such that it points in a direction away from the patient's toes and towards the bed. Such an embodiment is beneficial if the patient is lying on his back on the bed, or even in situations where the patient is lying on his side. Of course, other orientations of the air connector 10 are also contemplated, and none are dependent on the orientation of the patient in a bed.

Figure 8:
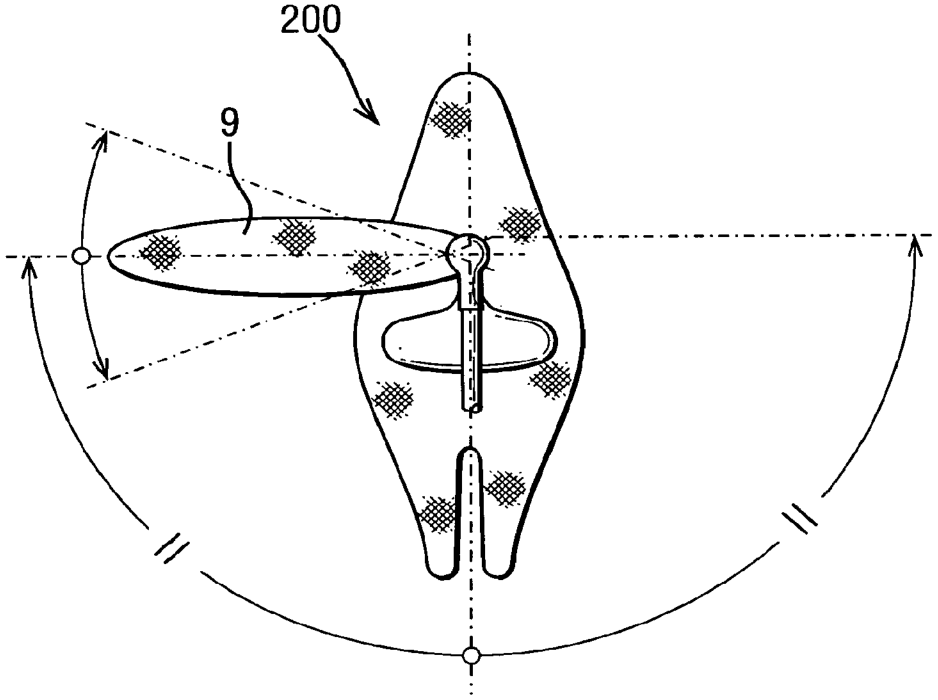
FIG. 8 illustrates a top view of an exemplary embodiment of the garment disclosed herein with limited rotational movement.
Figure 9:
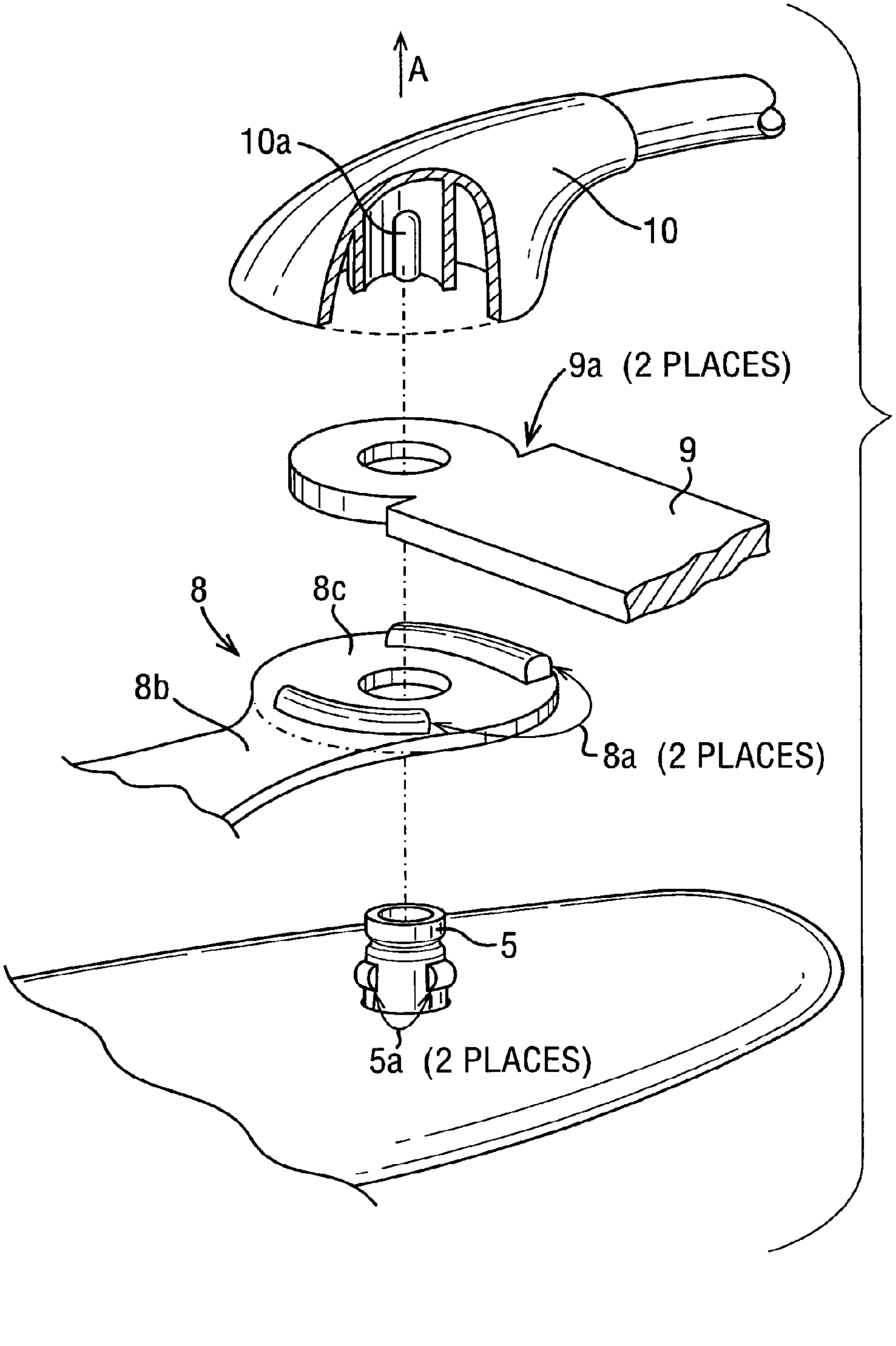
FIG. 9 illustrates an exploded isometric view of one embodiment of an assembly of components that may be employed to provide the limited rotation seen in the garment of FIG. 8.

Looking now collectively at FIGS. 8 and 9, FIG. 8 illustrates a top view of an exemplary embodiment of a garment 200 constructed as disclosed herein with limited rotational movement. FIG. 9 illustrates an exploded isometric view of one embodiment of an assembly of components that may be employed to provide the limited rotation seen in the garment 200 of FIG. 8. As shown in FIG. 8, the limited rotational movement (or pivot) of the heel strap 9 occurs in an arc once the garment 200 is oriented as left-handed or right-handed at either the point of manufacture or use.

While the example shown in FIG. 8 depicts a garment configured as left-handed for use on a patient's left foot, right-handed embodiment of the garment 200 would typically be a mirror image. Moreover, as shown in the figures, the position of the heel strap 9 is made adjustable with respect to the ankle of a patient within the limit of rotation/pivot of the heel strap 9. As such, the heel strap 9 may be preferentially located to lay either above, across or below the ankle bone to achieve maximum comfort for the patient during use of the garment. In addition, such adjustment in heel strap 9 position maximizes comfort during wearing and use of the garment irrespective of limb size, shape or swelling.

To provide the limited rotation, a protrusion feature 10*a* of the assembly shown in FIG. 9, may be included as part of the air connector 10 to limit rotation of the air connector 10 within a desired range of motion. In such an embodiment, the protrusion feature 10*a* would work in conjunction with stop features 5*a* on the stem of the port 5. Specifically, this type of arrangement permits rotation of the air connector 10 about the stem of the port 5 only within the limits of the recess of the stop features 5*a*. A similar limit feature 9*a* may or may not also be included for use in limiting the rotation/pivot of the heel strap 9. If employed, the limit feature 9*a* may be used in conjunction with another stop feature 8*a* located on the shank outer 8. As before, this type of arrangement permits rotation of the heel strap 9 about the stem of the port 5 only within the limits of the recess of the stop feature 8*a* located on the shank outer 8. In addition, as mentioned above, in some embodiments the garment does not include a shank outer 8. As illustrated by the broken line in FIG. 9, in such embodiments the neck 8*b* (and the remainder of the shank outer 8) are not present, leaving only a washer 8*c* in place of the shank outer 8.

A further modification may be envisaged where lifting of air connector 10 in direction of arrow A would be sufficient to withdraw and temporarily disengage protrusion feature 10*a* from the recess of the stop features 5*a*. In such an embodiment, the protrusion feature 10*a* may slide above the stop feature 8*a* when the air connector 10 is pulled in direction of arrow A and pivoted, for example, by 180 degrees. Once released, the protrusion feature 10*a* may then engage at an alternative stop feature location, for instance, 180 degrees off-set from the first stop feature 5*a*. Such a pull and twist mechanism may also employ spring biasing to maintain normal engagement of the protrusion feature 10*a* within either of the recesses of the stop features 5*a*.

Figure 10:
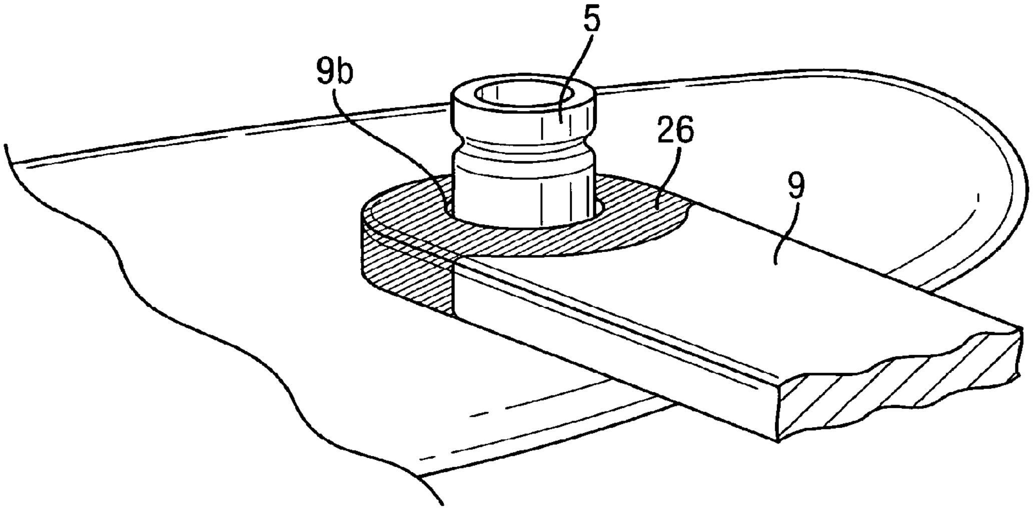
FIG. 10 illustrates a close-up isometric view of a portion of the assembly illustrated in FIG. 9.
Figure 11:
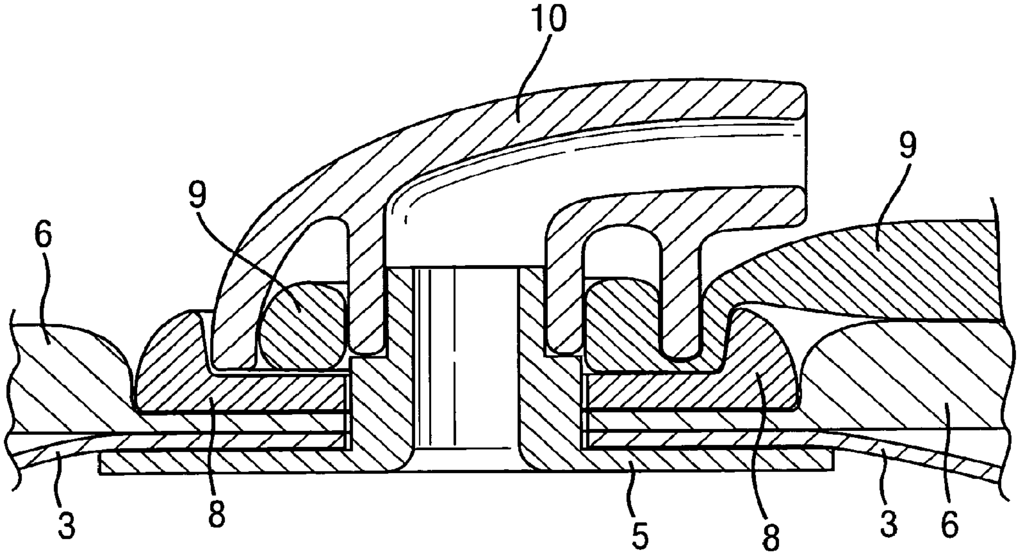
FIG. 11 illustrates a side section view of the assembly illustrated in FIG. 9.

Referring now collectively to FIGS. 10 and 11, FIG. 10 illustrates a close-up isometric view of a portion of the assembly illustrated in FIG. 9, while FIG. 11 illustrates a side section view of the assembly illustrated in FIG. 9. As shown, FIGS. 10 and 11 illustrate retaining the ends of the heel strap 9 to the garment by engagement of a location hole 9*b* pierced into the end of the heel strap 9 to be fitted over the stem of the port 5. As shown in FIG. 11, the end of the heel strap 9 with the location hole 9*b* is then entrapment between the port 5 and air connector 10, with the shank outer 8 (or simply washer 8*c*) therebetween, once the air connector 10 engages the port 5.

In embodiments employing this configuration, a clearance between mating components may also be included to allow unhindered rotation between the heel strap 9 and the stem of the port 5. Alternatively, a reduced clearance to facilitate some compression of the heel strap to allow rotation against friction, or minimal clearance to prevent rotation completely, may also be employed during construction of the garment. In addition, the area surrounding the hole 9*b* may also be formed with additional support in the form of a hole reinforcement 26. The reinforced area 26 may, for example, be inserted or added after manufacture of the heel strap 9, or it may be integrally formed with the end of the heel strap 9.

Figure 12:
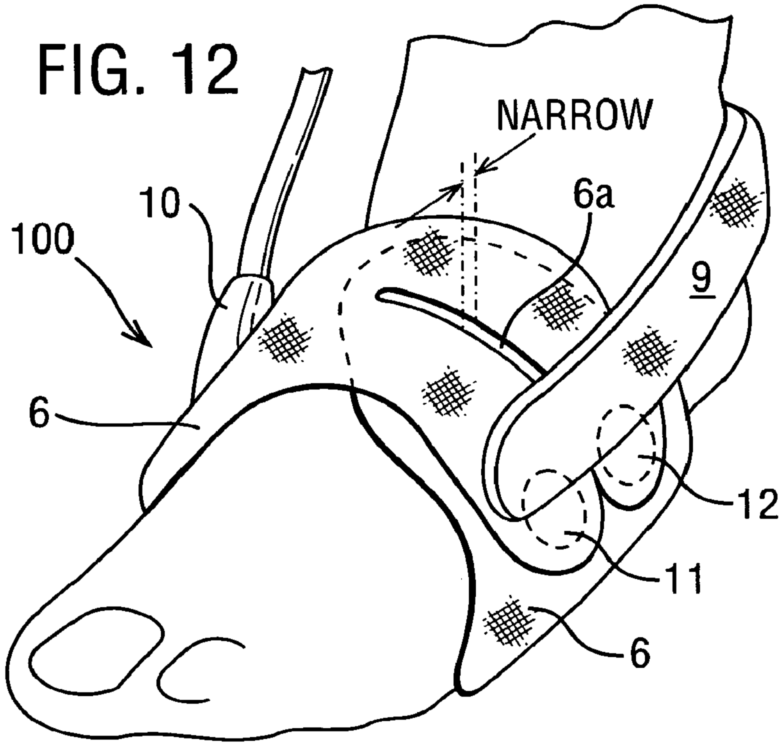
FIGS. 12 & 13 illustrate alternative embodiments of the dorsum straps of a garment constructed as disclosed herein.
Figure 13:
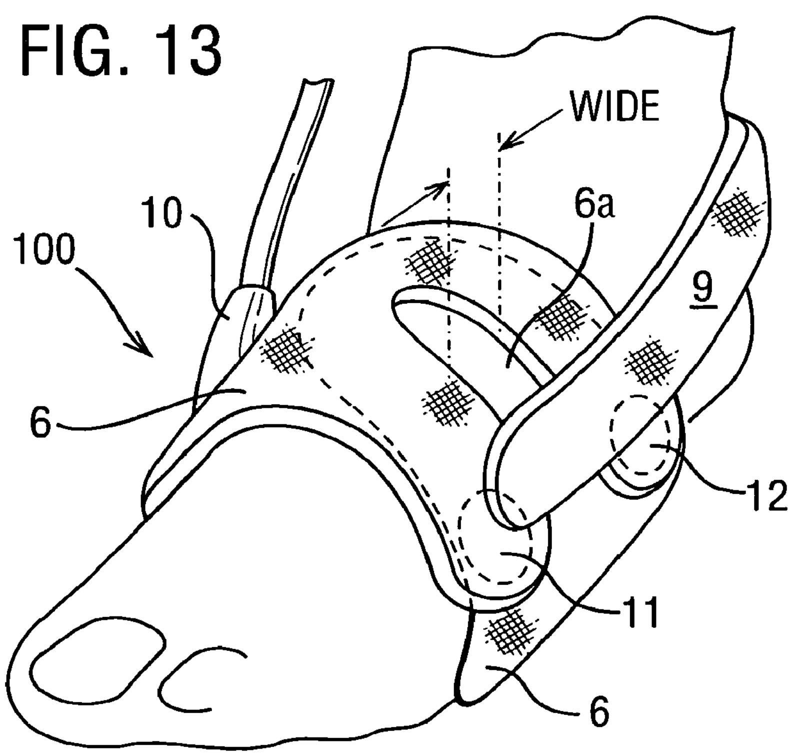

Turning now collectively to FIGS. 12 & 13, illustrated are alternative embodiments of dorsum straps for a garment constructed as disclosed herein. FIGS. 12 and 13 show alternatives for improving the fit of the garment to a patient's foot by separating the dorsal area into two or more elements, each with individual attachment by means of hook components 11, 12. The hook components 11, 12 are configured to attach to the skin side 23 of the upper fabric 6, with the corresponding loop material, in a conventional hook-and-loop fastener, found on the outside of the upper fabric 6.

Separation of the dorsum area by means of a slot 6*a* permits retention of the hoop strength necessary to resist the force of inflation of the bladder 1 within the garment 100 when fitted to a patient's foot, while allowing more subtle positioning and adjustment of the individual closures to better account for variations in the shape or size of the dorsum of the foot. In addition, however, a padded area over the dorsum of the foot essential to avoid skin abrasion during use of the garment 100 is also maintained. Looking specifically at the figures, FIG. 12 illustrates a narrow slot 6*a* in the dorsum portion of the garment 100, while FIG. 13 illustrates a wide slot 6*a* in the dorsum portion. Moreover, the width of slot 6*a* may be selected during mounting of the garment 100 to the foot through stretching of the individual attachments in opposing directions, or it may be established at the time of manufacture for the garment 100.

Figure 14:
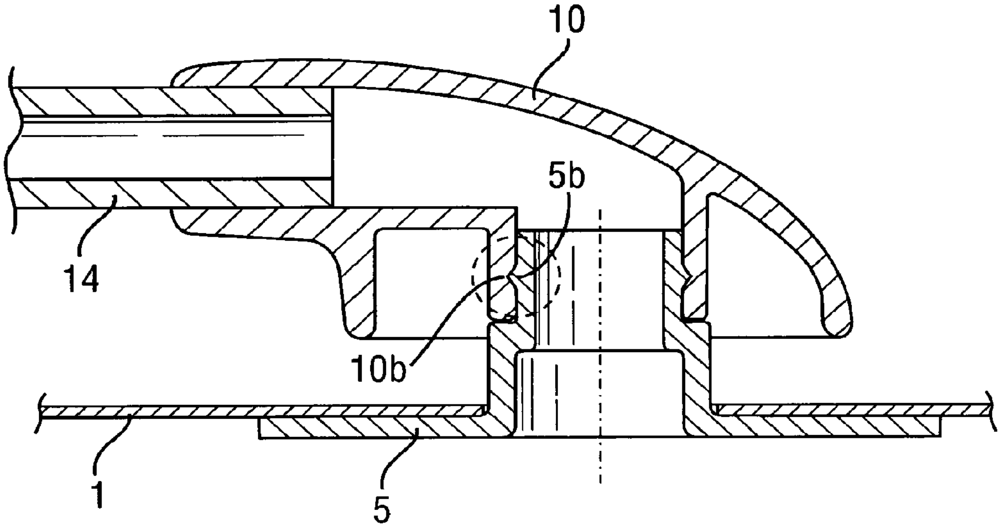
FIG. 14 illustrates a side section view of an exemplary embodiment of an air connector to a garment as provided herein.

Turning now to FIG. 14, illustrated is a side section view of an exemplary embodiment of an air connector 10 to a garment constructed as provided herein. As shown, the entry of an air hose 14 into the air connector 10 may be from the rear of the foot or from the toe-end of the foot, or even at some intermediate point therebetween. In addition, the approach of the air hose may also be from either above or below the arch of the foot.

During use, the garment may be used while the patient is confined to a bed or sitting, for example, in a chair. If the garment is used when the patient is lying on a bed, the air inflation controller/system is likely to be positioned on, beneath, or adjacent to the bed. If the garment is used while the patient is sitting in a chair, then the air inflation controller/system is typically located either on or adjacent to the bed. In either situation, it is important to ensure that the air hose 14 from the controller to the garment does not present a safety hazard through tripping, or may become entangled with each other becoming detached or kinked. As a result, the orientation and direction of the air hose with respect to the garment is important in avoiding such handling and usage problems.

Also illustrated in FIG. 14 is a detail of an exemplary embodiment of connection between the stem of the port 5 and the air connector 10. More specifically, the air connector 10 is shown attached to the stem of the port 5 via a snap-fit connection formed, for example, from the engagement of a protrusion 5*b* on the stem of the port 5 with a groove 10*b* on an inner bore of the air connector 10. Of course, the positions of the protrusion 5*b* and the groove 10*b* on their respective components may be reversed, or even have a profile different than that illustrated. In the illustrated embodiment, as the air connector 10 is pressed over and down the stem of the port 5, the protrusion 5*b* eventually mates with the groove 10*b*, causing a positive engagement between the two parts. While in some embodiments, such an engagement provides a seal between the air connector 10 and the port 5, the air connector 10 may still be configured to pivot about the stem of the port 5 for obtaining a desirable orientation of the air hose, when the protrusion 5*b* and groove 10*b* are both annular. Moreover, a seal between the two need not be made with the engagement.

Figure 15:
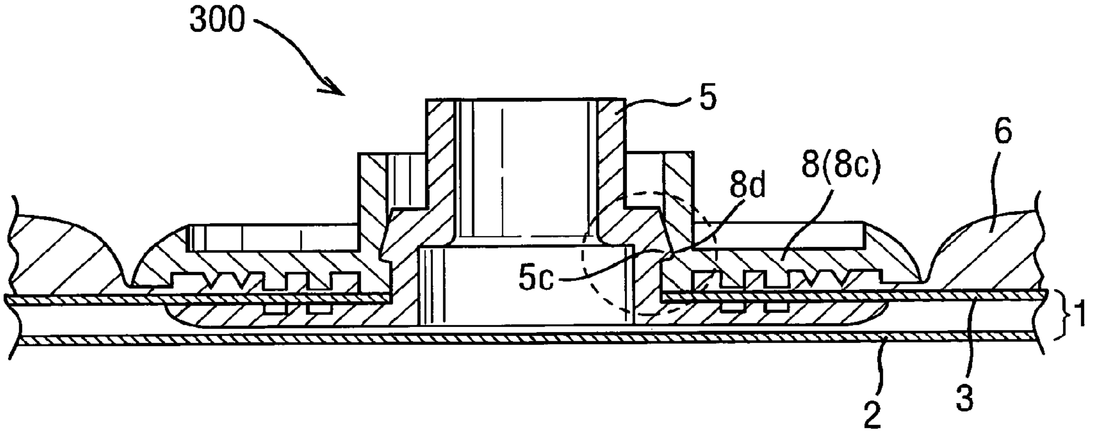
FIG. 15 illustrates a side section view of an exemplary embodiment of an assembly employed to retain the bladder in a disclosed garment.

Looking now at FIG. 15, illustrated is a side section view of an exemplary embodiment of an assembly 300 employed to retain the bladder 1 in a garment constructed as disclosed herein. In the illustrated embodiment, the bladder 1 (comprising layers 2 and 3) is coupled to the upper fabric 6 by snap fit of the shank outer 8 (washer 8*c*) over the stem of the port 5. Initially, the port 5 is coupled to the outside film 3 of the bladder 1, as described above. The stem of the port 5 is then passed through an aperture formed in the upper fabric 6 of the garment, which locates the bladder 1 with respect to the upper fabric 6.

Next, as the shank outer 8 (or washer 8*c*) is slid over the stem of the port 5, a port retainer groove 8*d* couples the shank outer 8 to the port 5 by, for example, engagement of protrusion 5*c* with the groove 8*d*. More specifically, the protrusion 5*c* is located on a portion of the stem of the port 5 proximate the bladder 1, while the groove 8*d* is located at the periphery of the inner bore of the hole formed through the shank outer 8 and configured to receive the stem. As the shank outer 8 slides over the stem of the port 5, the material comprising the shank outer 8, and possibly the material comprising the port 5, provides enough expansion of the shank outer 8 over the stem so that the groove 8*d* eventually mates with the protrusion 5*c*. Moreover, this snap-fit of the shank outer 8 and the port 5 may be configured to be removable or permanent through design of the protrusion 5*c* and/or the groove 8*d*. Of course, the present disclosure is broad enough to encompass either embodiment.

Figure 16:
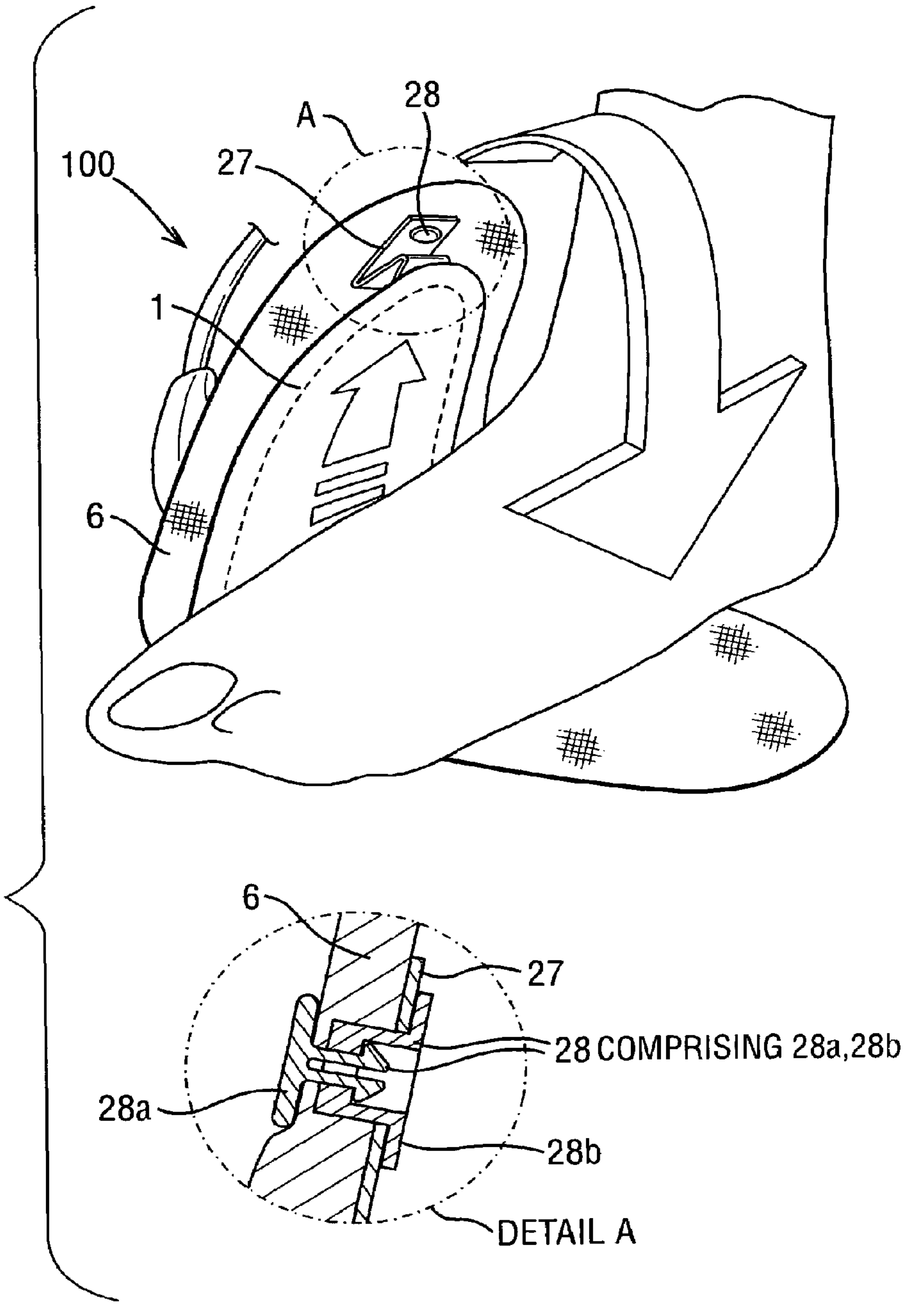
FIG. 16 illustrates an isometric view of a garment as provided herein having a means for restraining a bladder to the upper fabric of the garment.

Referring now to FIG. 16, illustrated is an isometric view of a garment as provided herein having an exemplary means for restraining a bladder 1 to the upper fabric 6 of a garment 100 constructed as described herein. Specifically, FIG. 16 and detail A show an embodiment of the garment 100 restraining the end of the bladder 1 in contact with the upper fabric 6, while allowing for differential movement between the bladder 1 and upper fabric 6. In use, when the garment 100 is worn on a patient's foot, the bladder 1 is in contact with the foot, or a foot covering, with the upper fabric 6 wrapped over the outside of the bladder 1.

Effectively, the upper fabric 6 lies on a greater radius than the bladder 1 relative to a reference point on the foot. In addition, the materials of construction are dissimilar, and the tensile strengths typically different. In embodiments where the upper fabric 6 and bladder 1 are not coupled for differential movement, creasing of the bladder 1 may occur and may lead to patient discomfort, as well as potential reduction in bladder life. Thus, a free-floating bladder 1 having differential movement with respect to the upper fabric 6 may avoid these issues by tethering the bladder 1 in contact with the upper fabric 6. In such embodiments, the outer film 3 is modified to incorporate a flexible tab 27 retained to the upper fabric 6 by, for example, a clip 28 or a suitable adhesive, weld or the like. Clip 28 may comprise snap-fit components, such as plug 28*a* and receptacle 28*b*. Furthermore, in many embodiments, it has also been shown that a bladder 1 that is free-floating requires less air to expand the bladder 1 during an inflation cycle.

Figure 17:
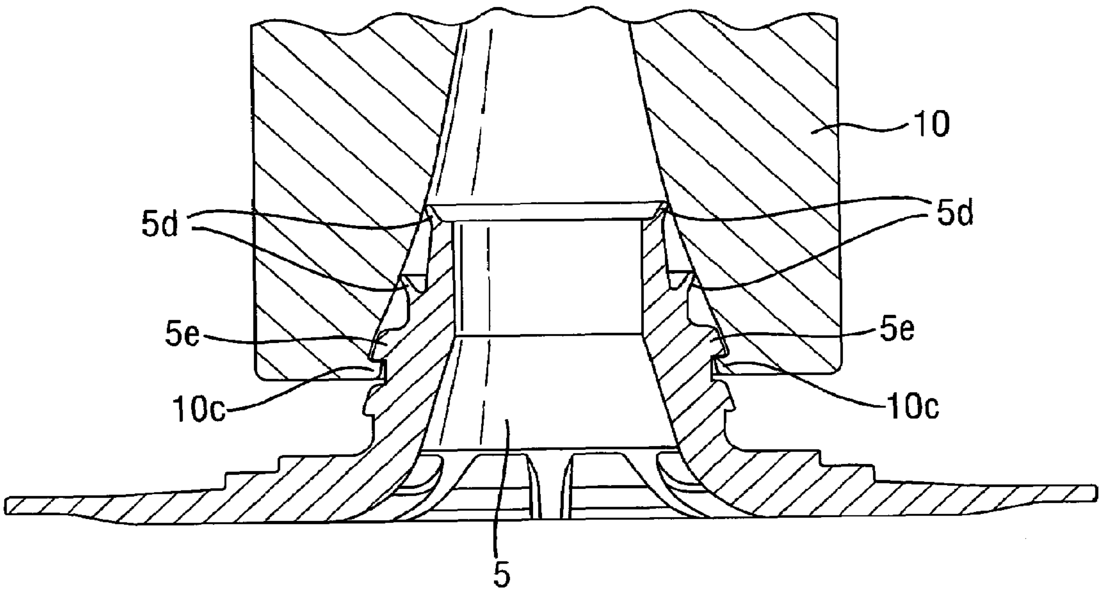
FIG. 17 illustrates a side section view of an exemplary embodiment of an air seal between the port and the air connector described above.

Turning now to FIG. 17, illustrated is a side section view of an exemplary embodiment of an air seal between the port 5 and the air connector 10 described above. In this embodiment, the illustrated connection beneficially allows rotational movement of the air connector 10 relative to the stem of the port 5, while maintaining seal integrity. Specifically, sealing is provided by dual annular lip seals 5*d* formed on the stem of the port 5. Primary sealing is provided by an upper annular lip seal (as this is the seal immediately on the pressurized side), while secondary sealing is provided by a lower annular lip seal, each formed on the stem of the port 5 and adapted to contact the central bore diameter of the air connector 10. In one embodiment, the lip seals 5*d* are dimensioned as an interference fit within the bore of the air connector 10, and include an external face in resilient contact with the bore. By providing two independent seals, the probability of seal failure between the port 5 and the air connector 10 during use of the garment 100 is substantially reduced.

Also illustrated are upper annular lip fasteners 5*e* formed about the outer surface of the stem of the port 5. As shown, the upper lip fastener 5*e* may be configured to engage a coupling lip 10*c* formed on the inner bore of the air connector 10. Thus, the coupling lip 10*c* and the upper lip fastener 5*e* may be snapped together to couple the air connector 10 to the port 5, while still allowing the air connector 10 to rotate about the stem of the port 5. To facilitate this type of engagement, either or both of the coupling lip 10*c* and the upper lip fastener 5*e* may be formed using semi-flexible material, although a garment constructed with these components is not limited to any particular type of material.

Figure 18:
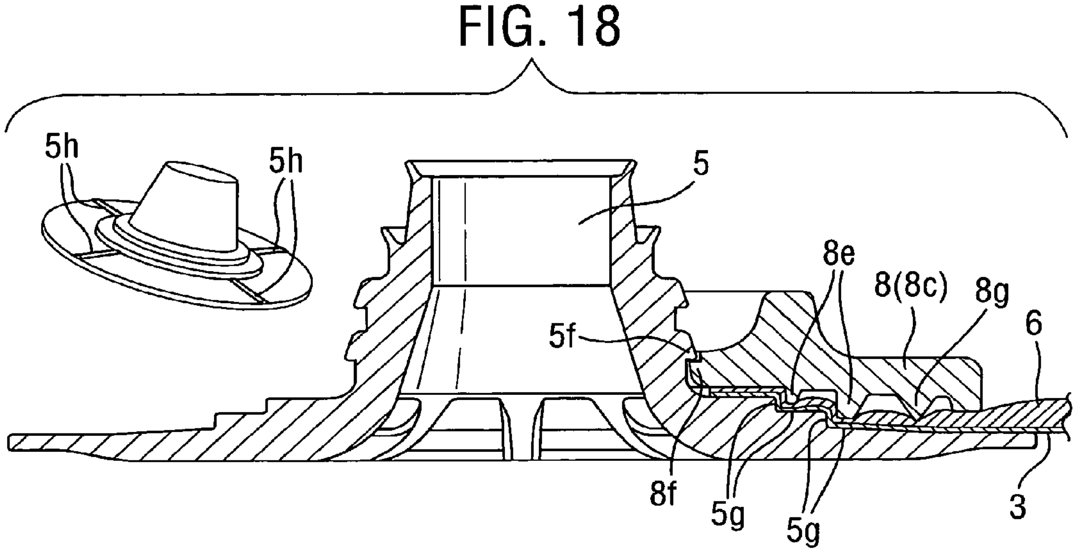
FIG. 18 illustrates a side section view of an exemplary embodiment of an assembly for sealing the port and the outer film of the bladder.

Looking now at FIG. 18, illustrated is a side section view of an exemplary embodiment of an assembly for sealing the port 5 and the outside film 3 of the bladder 1. The shank outer 8 (or washer 8*c*) may be coupled to the port 5 using a coupling lip 8*f* formed around the inner diameter of the shank outer 8, which is adapted to engage with a lower annular lip fasteners 5*f*. Alternatively or additionally, the upper fabric 6 and outside film 3 may be welded (see FIG. 19) to the flange area of the port 5 to secure engagement and sealing between the two. Employing such welding may also provide the benefit of preventing the port 5 from revolving relative to the outside film 3 when, for example, the air connector 10 is rotated about the port 5, or even during handling in automated assembly of the garment.

In the illustrated embodiment, a seal is also provided by entrapment of the outside film 3, as well as upper fabric 6, between the flange area of the port 5 and the flange area of the shank outer 8 (or washer 8*c*). In such embodiments, the mating surface on the flange area of the port 5 may incorporate dual ledges 5*g* having corresponding protrusions 8*e* on the flange area of the shank outer 8, which extending towards the upper fabric 6. When the outside film 3 is entrapped between the port 5 and the shank outer 8, the outside film 3 is distorted by alignment of the protrusions 8*e* and ledges 5*g* through high load forces placed in specific sealing areas where the two meet. Specifically, the bottom surfaces of the protrusions 8*e* compress the upper fabric 6 and outside film 3 against the face of the flange area of the port 5 in corresponding first and second axial compression zones. Also, inner faces of the protrusions 8*e* further compress the upper fabric 6 and outside film 3 against the sides of the ledges 5*g* in corresponding first and second radial compression zones. As a result of these compression areas, the high load forces employed provide sealing to further resist air leakage from the bladder 1 at normal inflation pressures.

Also illustrated in FIG. 18 is the use of fabric spikes 8*g* annularly located near the outer edge of the shank outer 8. These fabric spikes 8*g* may be employed to trap the upper fabric 6 and outside film 3 against the flange area of the port 5, in some cases piercing up to 90% of the materials in an effort to secure the materials in their desired locations. In addition, in some embodiments, the mating surface on the flange area of the port 5 also includes radial ribs 5*h* protruding therefrom and towards the upper fabric 6. When employed, the radial ribs 5*h* are configured to prevent rotational movement of the bladder 1 about the stem of the port 5, as well as rotation of the bladder 1 with respect to the upper fabric 6, by gripping the bladder 1 and upper fabric 6 across any potential rotational direction.

Figure 19:
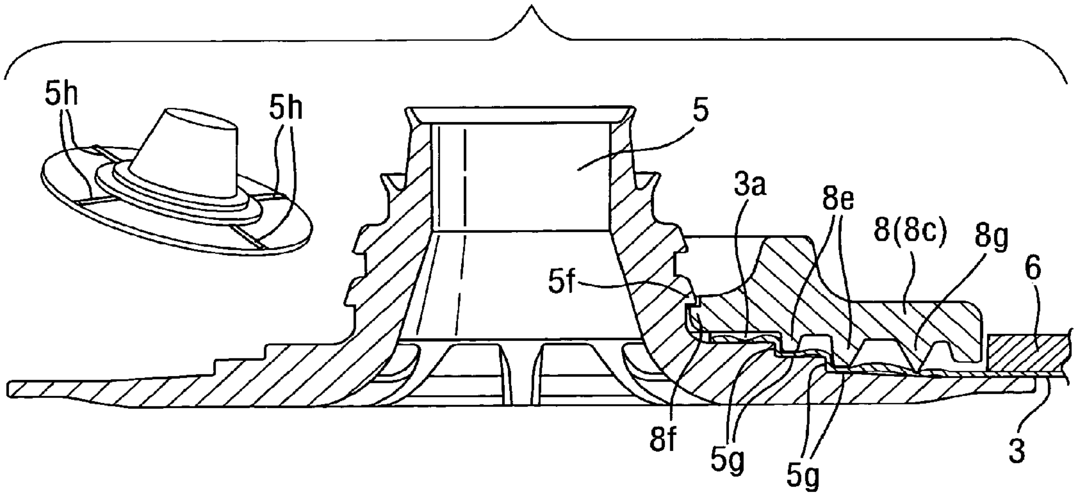
FIG. 19 illustrates a side section view of an alternative embodiment of an assembly for sealing the port and the outer film of the bladder.

Turning now to FIG. 19, illustrated is a side section view of an alternative embodiment of an assembly for sealing the port 5 and the outside film 3 of the bladder 1. FIG. 19 shows an exemplary embodiment for providing the seal, including a clearance hole formed in the upper fabric 6 through which the flange area of the shank outer 8 (or washer 8*c*) will pass. In this embodiment, the outside film 3 is in direct contact with the flange area of the port 5 and the flange area of the shank outer 8 (or washer 8*c*) to eliminate potential variation due to upper fabric 6 compression, thickness, texture, or the like. As shown in FIG. 19, the ledges 5*g* and corresponding protrusions 8*e* may be employed as described with reference to FIG. 18, thus employing the axial and radial compression zones described above.

Furthermore, FIG. 19 illustrates the use of a weld 3*a* between the outside film 3 and the upper surface of the flange area of the port 5. In a more specific embodiment, the weld 3*a* may be an ultrasonic weld 3*a* of the type commonly used in the field, however other types of welds 3*a* are also possible. By employing such a weld 3*a*, additional sealing is provided between the port 5 and outside film 3. Also, annularly dispersed fabric spikes 8*g* may be employed to trap the outside film 3 against the flange area of the port 5. Moreover, some embodiments of the garment may also include the radial ribs 5*h* protruding from the flange area of the port 5, as described above.

Referring now to FIG. 20, illustrated is an exploded isometric view of one embodiment of a shank outer 8 for use with a garment 100 constructed as disclosed herein. As mentioned previously, the shank outer 8 may be used rather than simply employing an outer washer 8*c* (indicated by broken line). In such embodiments, a stiffening shank comprising the shank outer 8, a shank inner 7 and the upper fabric 6 may be provided on both sides of the upper fabric 6 to provide a substantially rigid structure to the garment 100. Although the illustrated embodiment shows the shank outer 8 and shank inner 7 visible to the wearer of the garment 100, other embodiments are contemplated where the shank inner 7, and perhaps the shank outer 8, are hidden from view. In such embodiments, either or both components of the shank assembly may be located inside the upper fabric 6.

When attaching the overall shank assembly to the upper fabric 6, the shank outer 8 may be located in position by passage of a number of projecting pegs 8*h* formed or attached to an underside of the shank outer 8. In such an embodiment, these pegs 8*h* pass through corresponding apertures 6*a* formed through the upper fabric 6, and are retained against, for example, by snap-fit, to shank inner 7. As illustrated, retaining may be accomplished by engagement of pegs 8*h* with corresponding mating collars 7*a* formed on the shank inner 7. Of course, other means of affixing the shank inner 7 to the shank outer 8 are also contemplated.

Similar to the entrapment of the bladder 1, the upper fabric 6 may be entrapped between the shank inner 7 and the shank outer 8 using a series of peripheral grooves 7*b* formed on the shank inner 7. These grooves may be employed to hold the upper fabric 6 in a compressed state between the shank inner 7 and the shank outer 6 so that the shank assembly stays firmly attached to the remainder of the garment 100. Moreover, the shank outer 8 may also include branding, marking or other identification of the garment 100 by inclusion of a label 29 thereon, as illustrated. In embodiments without an outer shank 8 (and simply employing a washer 8*c*), an aperture may be formed through the plantar region of the upper fabric to the shank inner 7. As a result, a label or other type of branding may be placed on the shank inner 7 and visible through the aperture.

Figure 21:
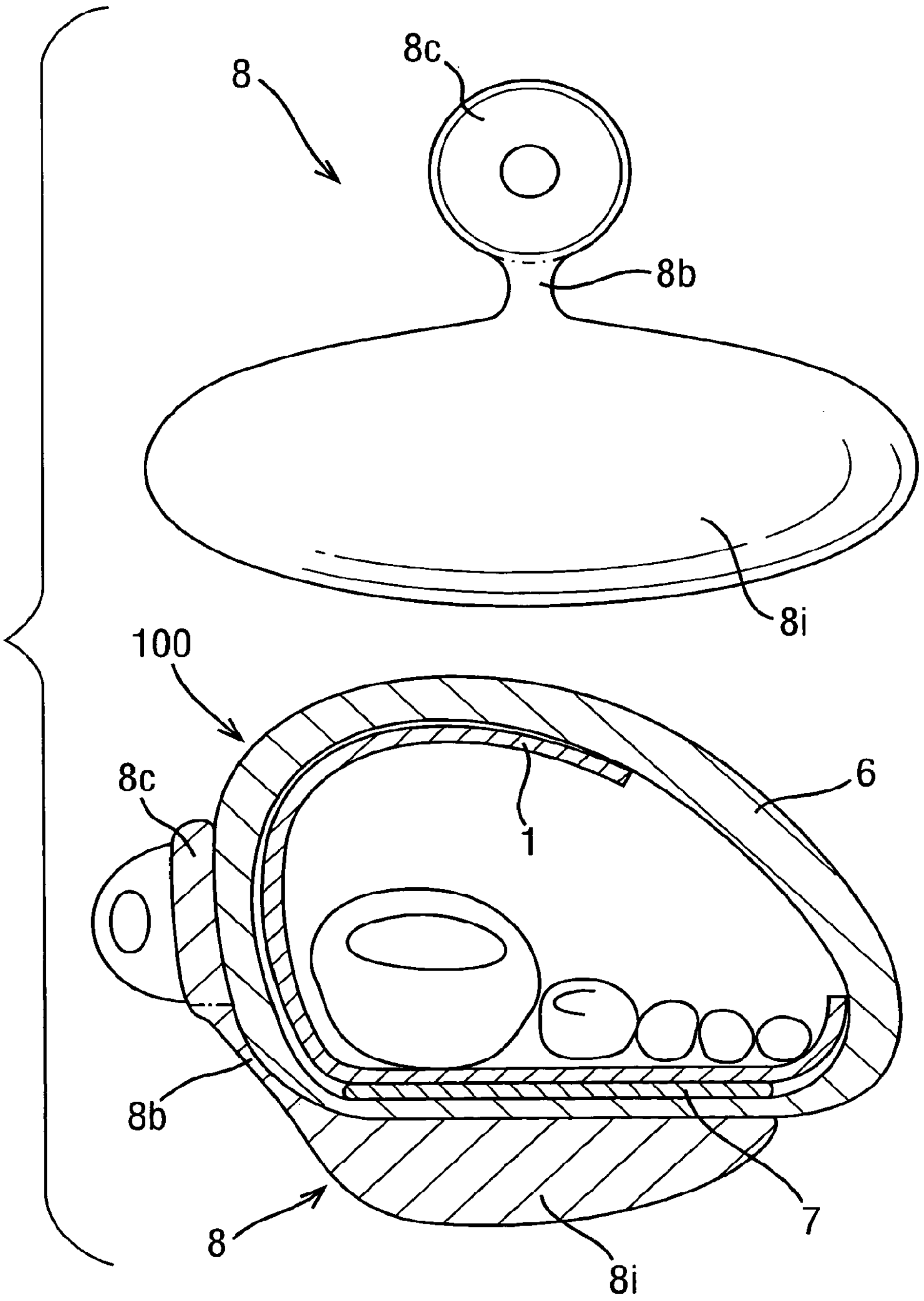
FIG. 21 illustrates an exemplary embodiment of the location of the shank assembly in relation to the port assembly.

Looking now at FIG. 21, illustrated is an exemplary embodiment of the location of the shank assembly in relation to the port assembly. Specifically, the shank outer 8 comprises a hole to receive the port 5, a sole area 8*i*, and the neck 8*b*. If a complete shank outer 8 is not used, only an outer washer 8*c* with the hole for the stem remains. As described in detail above, the hole may include coupling features for use in locating and retaining the port 5 in position with respect to the upper fabric 6. As a result, the bladder 1 is also positioned with respect to the upper fabric 6, and thus with respect to the patient's foot during use.

The purpose of the sole area 8*i* of the shank assembly is to work in conjunction with the shank inner 7 to provide a stiff resistive area to oppose the inflation of the bladder 1 in a specific location with respect to the patient's foot. By opposing inflation of the bladder 1 here, the inflation force is focused towards the arch of the foot to treat circulation problems in the foot. Furthermore, neck 8*b* has the practical function as a joiner to allow the washer portion 8*c* and the sole area 8*i* of the shank outer 8 to be joined or formed as a single unit. Moreover, the neck 8*b* also assists in preventing extension of the upper fabric 6 between the washer portion 8*c* and the sole area 8*i* during inflation of the bladder 1. Prevention of such extension serves to focus the inflation into the arch of the foot as well, while reducing air consumption. Of course, the neck 8*b* is typically configured to be flexible so as to allow the shank assembly to conform to the curvature of the foot when the garment 100 is worn.

Figure 22:
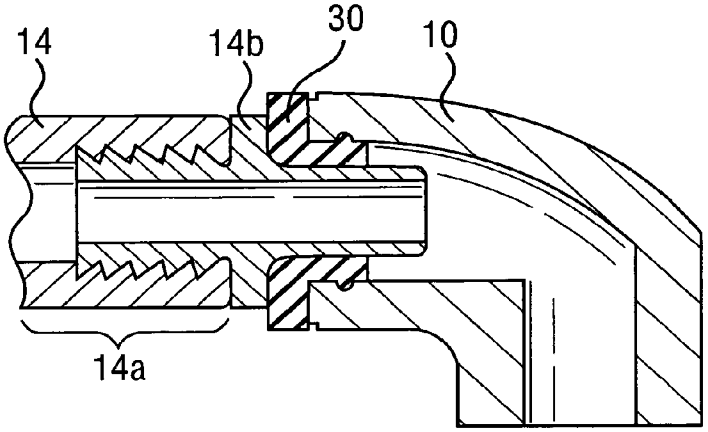
FIG. 22 illustrates one exemplary embodiment of the air connector mated to a detachable air hose.

Referring now to FIG. 22, illustrated is one exemplary embodiment of the air connector 10 mated to a detachable air hose 14. In addition, FIG. 22 also illustrates a seal 30, which may be composed of a flexible material, such as rubber, between the air connector 10 and an air fitting 14*b*. As shown, an end 14*a* of the air hose 14 may be slipped over the entire length of an internal stem of the air fitting 14*b* to create a seal between the two. Then, an external stem of the air fitting 14*b* may be pressed into the seal 30 to provide an air-tight seal between the air source (not illustrated) and the air connector 10, and thus the bladder 1. In addition, the internal stem may include serrations on its external surface to assist in keeping the hose 14 attached to the fitting 14*b* during use.

Figure 23:
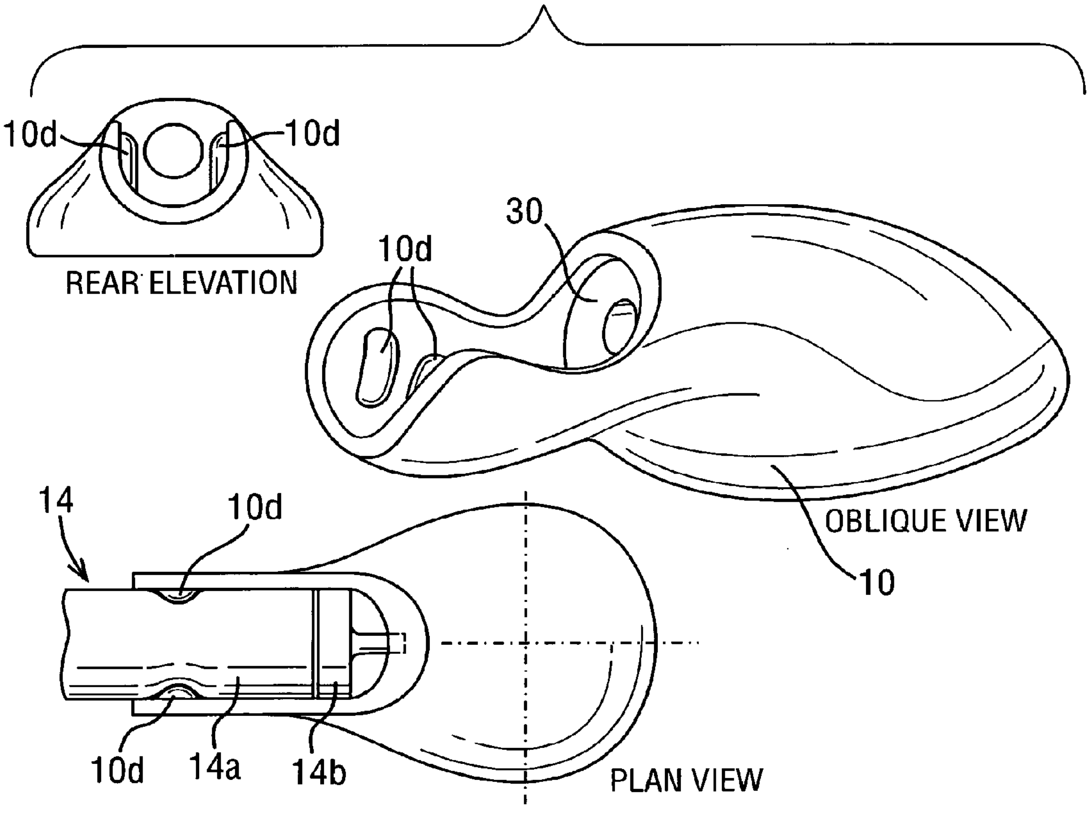
FIG. 23 illustrates an alternative embodiment of a means for retaining the air hose shown in FIG. 22 to the air connector.

Turning now to FIG. 23, illustrated is an alternative embodiment of a means for retaining the air hose 14 shown in FIG. 22 to the air connector 10. During use of the garment, separation of the air source from the garment is a nuisance to the user and/or medical staff employing the garment. Accordingly, the end 14*a* of the air hose 14 may be pressed between, and thus restrained by, hose locking features 10*d*. Specifically, a distance between the hose locking features 10*d* and the face of seal 30 may be selected to correspond to the length of the internal stem (see FIG. 22) such that locking features 10*d* crimp the hose 14 immediately past the end of the internal stem. As a result, the internal stem, and therefore the fitting 14*b*, cannot slide back and away from the seal 30, thus creating a secure engagement of the hose end 14*a* (and fitting 14*b*) into and against the seal 30 on the air connector 10. Although the hose locking features 10*d* are illustrated as hose locking protrusions 10*d* extending from a cradle portion of the air connector 10, other types of the hose locking features 10*d* are also contemplated.

Figure 24:
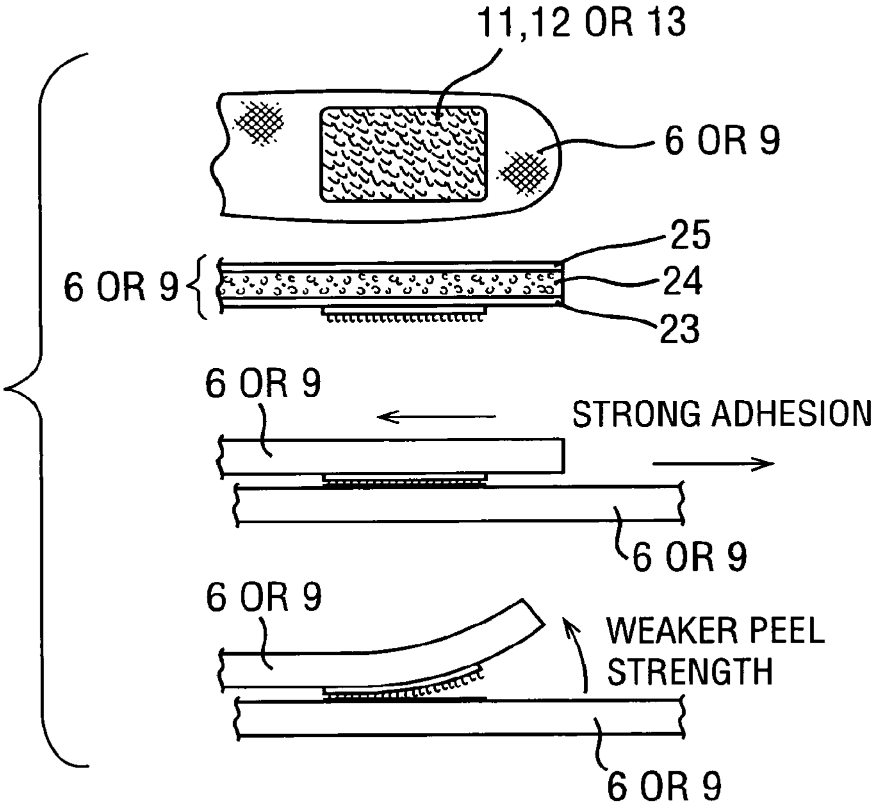
FIG. 24 illustrates an exemplary embodiment of hook fasteners of a hook-and-loop fastening means, which may be used to secure the garment disclosed herein to a patient's foot.

Looking now at FIG. 24, illustrated is an exemplary embodiment of hook fasteners 11, 12, 13 of a hook-and-loop fastening means, which may be used to secure the garment disclosed herein to a patient's foot. Specifically, the hook fasteners 11, 12, 13, which are located proximate the ends of the dorsum straps of the upper fabric 6 or the heel strap 9, may be engaged with the outer surface 25 of the upper fabric 6, when the outer surface 25 includes corresponding loop fasteners. As shown, the hook fasteners 11, 12, 13 may be located slightly away from the edge of the fabric on which they are mounted to allow the edge of the upper fabric 6 or heel strap 9 to be lifted in order to release the hook engagement through a peeling motion.

Figure 25:
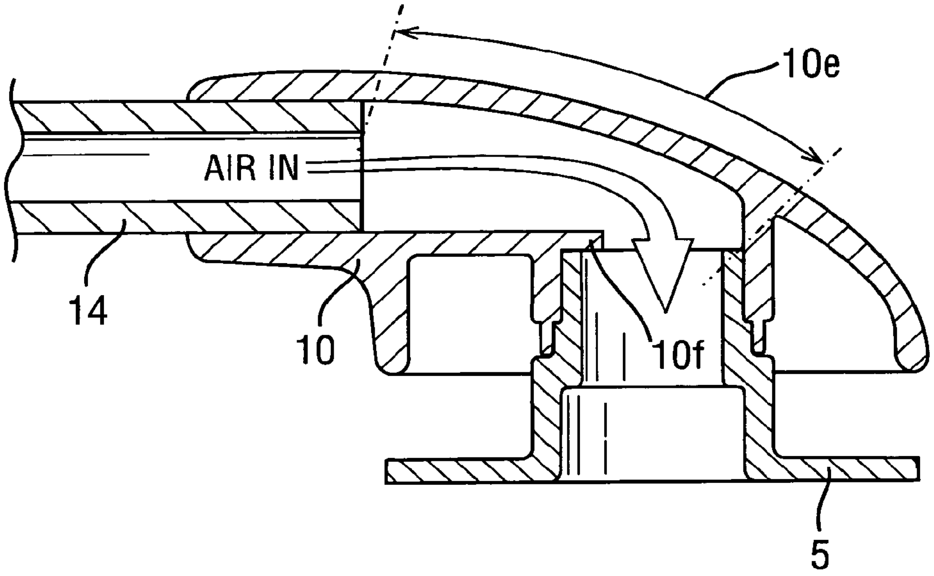
FIG. 25 illustrates an inner profile of one embodiment of the air connector used with the disclosed garment.

Referring now to FIG. 25, illustrated is an inner profile of one embodiment of the air connector 10 used with the disclosed garment. This figure illustrates the passage of air from the air hose 14 and through the air connector 10 before passing into the port 5 and then into the bladder 1. In a specific embodiment, during an inflation operation, air is pumped into the bladder 1 at high velocity from the air/source generator (not illustrated) so as to rapidly inflate the bladder 1 in accordance with the desired treatment.

A potential disadvantage to such a high flow rate may be the unwanted generation of noise, particularly in a hospital setting or at night. Unfortunately, the continued presence of such noise may impact the patient's compliance with his treatment. As shown in FIG. 25, such noise may be reduced or eliminated by careful design of the internal passages of the air connector 10. For example, the proportion, profile and internal surface finish of the internal gallery 10*e* and/or of the lip detail 10*f* the air connector 10 may individually or collectively help to prevent or reduce unwanted noise during use of the garment. Thus, by providing a more aerodynamic internal gallery 10*e* for the air connector 10, noise caused by air passing through at a high velocity may be reduced or eliminated.

Figure 26:
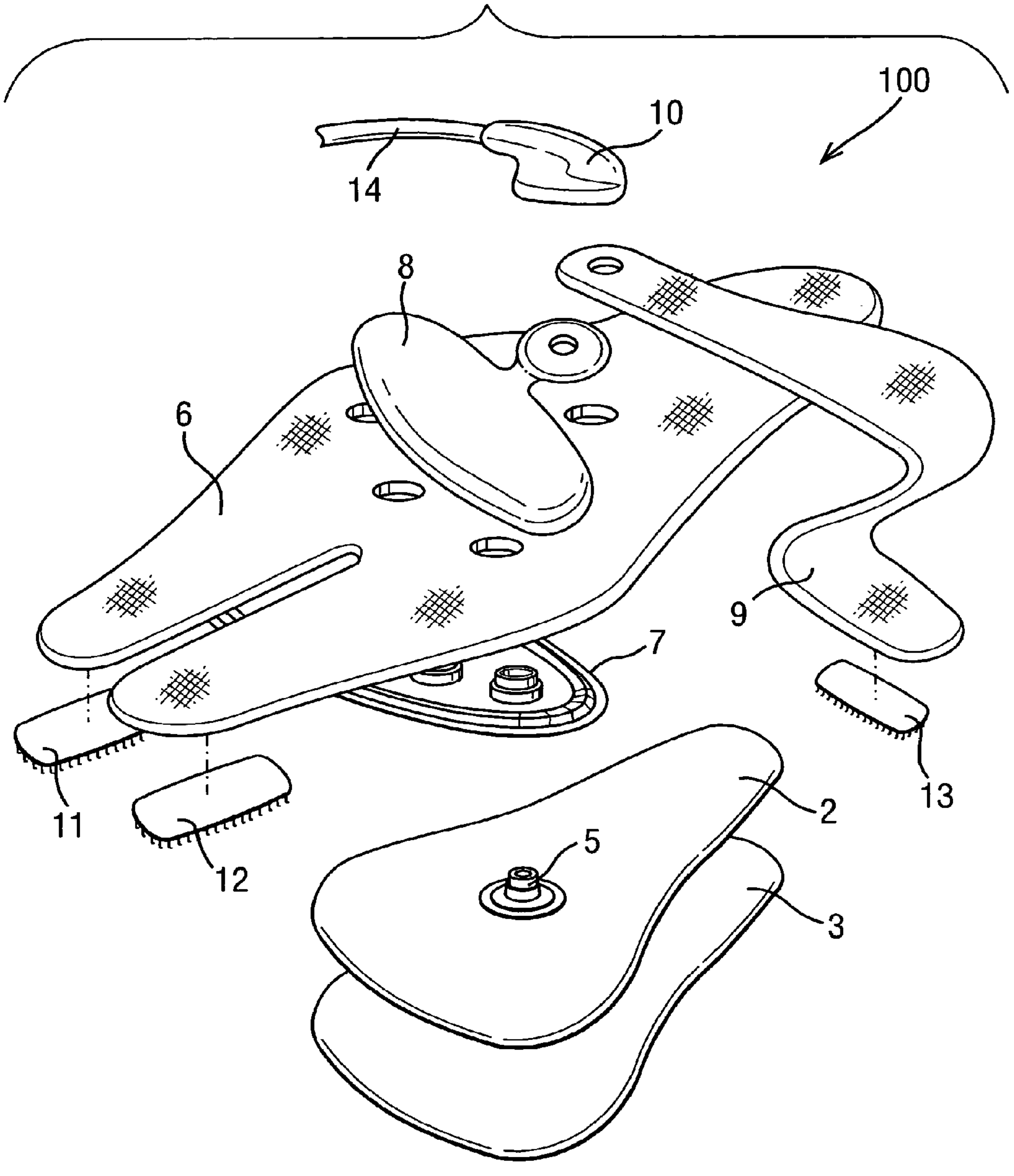
FIG. 26 illustrates an exploded isometric view of all of the components in an exemplary embodiment of a garment constructed as disclosed herein.

Turning finally to FIG. 26, illustrated is an exploded isometric view of all of the components in an exemplary embodiment of a garment 100 constructed as disclosed herein. The exploded view helps to illustrate the relative locations of all the components in the garment 100, which assists in gaining an understanding of the construction of the garment 100, whether by automated or manual assembly.

While various embodiments of a garment for use in pump therapy to enhance venous and/or arterial blood flow constructed according to the principles disclosed herein, and related method of manufacturing such garments, have been described above, it should be understood that they have been presented by way of example only, and not limitation. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. An inflatable medical device hose-clamp system for securing a hose to an air connector, the system comprising:

a fitting having an internal stem and an external stem, the internal stem having a predetermined length and an outer diameter configured to hermetically engage an inside diameter of an end of the hose to the predetermined length;

a cradle configured to receive the internal stem and the end of the hose, the cradle comprising:

opposing locking protrusions within the cradle and radially extending towards a center of the cradle, a top of each locking protrusion spaced from a top of another by less than the outer diameter of the hose, and a seal positioned from the locking protrusions at substantially the length of the internal stem and configured to hermetically engage the external stem, the locking protrusions configured to crimp the outside diameter of the hose at an end of the internal stem opposite the external stem when the external stem is received by the seal and the hose and internal stem are received within the cradle; and wherein the cradle is a portion of an air connector configured to hermetically engage an inflation port of a garment for use in pump therapy for enhancing venous and arterial blood flow of a human foot, the hose providing air to the port.

2. A hose-clamp system according to claim 1, wherein the opposing locking protrusions comprise two opposing locking protrusions configured to crimp the hose on opposing sides of the hose.

3. A hose-clamp system according to claim 1, wherein the internal stem comprises annular serrated protrusions extending from an outside diameter thereof and adapted to positively engage the inside diameter of the hose.

4. A hose-clamp system according to claim 1, wherein the seal comprises a hole formed therethrough having a diameter less than an outer diameter of the external stem.

5. A hose-clamp system according to claim 1, wherein the seal comprises rubber.

* * * * *